(12) United States Patent
Favor et al.

(10) Patent No.: US 7,747,822 B1
(45) Date of Patent: Jun. 29, 2010

(54) MAINTAINING MEMORY COHERENCY WITH A TRACE CACHE

(75) Inventors: John G. Favor, Santa Clara, CA (US); Richard W. Thaik, Santa Clara, CA (US)

(73) Assignee: Oracle America Inc., Redwood City, CA (US)

( * ) Notice: Subject to any disclaimer, the term of this patent is extended or adjusted under 35 U.S.C. 154(b) by 571 days.

(21) Appl. No.: 11/591,024

(22) Filed: Oct. 31, 2006

Related U.S. Application Data

(60) Provisional application No. 60/731,785, filed on Oct. 31, 2005.

(51) Int. Cl.
*G06F 12/08* (2006.01)

(52) U.S. Cl. .................. 711/125; 711/118; 711/141; 711/144

(58) Field of Classification Search ............... 711/125, 711/141, 118, 144
See application file for complete search history.

(56) References Cited

U.S. PATENT DOCUMENTS

| | | | |
|---|---|---|---|
| 4,912,707 | A | 3/1990 | Kogge et al. |
| 5,381,533 | A | 1/1995 | Peleg et al. |
| 5,568,380 | A | 10/1996 | Brodnax et al. |
| 5,632,023 | A | 5/1997 | White et al. |
| 5,649,136 | A | 7/1997 | Shen et al. |
| 6,014,742 | A * | 1/2000 | Krick et al. ............... 712/236 |
| 6,018,786 | A | 1/2000 | Krick et al. |
| 6,031,992 | A | 2/2000 | Cmelik et al. |
| 6,185,675 | B1 | 2/2001 | Kranich et al. |
| 6,449,714 | B1 | 9/2002 | Sinharoy |
| 6,604,060 | B1 | 8/2003 | Ryan et al. |

2006/0179346 A1  8/2006  Bishop et al.

OTHER PUBLICATIONS

Almog, Y. et al., Specialized Dynamic Optimizations for High-Performance Energy-Efficient Microarchitecture, Proceedings of the International Symposium on Code Generation and Optimization, 2004 (12 pages).
Chaparro, P. et al., Distributing the Fronted for Temperature Reduction, Proceedings of the 11th Symposium on High-Performance Computer Architecture, Feb. 12-16, 2005 (10 pages).
Colwell, R. P. et al., A VLIW Architecture for a Trace Scheduling Compiler, 1987, pp. 180-192 (13 pages).

(Continued)

*Primary Examiner*—Sanjiv Shah
*Assistant Examiner*—Jae U Yu
(74) *Attorney, Agent, or Firm*—Osha • Liang LLP

(57) ABSTRACT

A method and system for maintaining memory coherence in a trace cache is disclosed. The method and system comprises monitoring a plurality of entries in a trace cache. The method and system includes selectively invalidating at least one trace cache entry based upon detection of a modification of the at least one trace cache entry.

If modifications are detected, then corresponding trace cache entries are selectively invalidated (rather than invalidating the entire trace cache). Thus trace cache coherency is maintained with respect to memory in a performance and power-efficient manner. The monitoring further accounts for situations where more than one trace cache entry is dependent on a single cache line, such that modifications to the single cache line result in invalidations of a plurality of trace cache entries.

21 Claims, 8 Drawing Sheets

OTHER PUBLICATIONS

Fisher, J. A., Trace Scheduling: A Technique for Global Microcode Compaction, IEEE Transactions on Computers, vol. C-30, No. 7, Jul. 1981, pp. 478-490 (13 pages).

Friendly, D. et al, Putting the Fill Unit to Work: Dynamic Optimizations for Trace Cache Microprocessors, Proceedings of the 31st Annual ACM/IEEE International Symposium on Microarchitecture, Nov. 30-Dec. 2, 1998, pp. 173-181 (9 pages).

Grunwald, D. and Ghiasi, S., Microarchitectural Denial of Service : Insuring Microarchitectural Fairness, Proceedings of the 35th Annual IEEE/ACM International Symposium on Microarchitecture, Nov. 18-22, 2002 (10 pages).

Hinton, G. et al., The Microarchitecture of the Pentium 4 Processor, Intel Technology Journal Q1, 2001 (12 pages).

IBM Technical Disclosure Bulletin, Grouping of Instructions, v. 38, n. 8, Aug. 1, 1995, pp. 531-534 (4 pages).

Katevenis, E. G., Reduced Instruction Set Computer Architectures for VLSI, Berkley, California 1983, pp. 67-68 and 190 (7 pages).

Rotenberg, E., Bennett, S., and Smith, J. E., Trace Cache: a Low Latency Approach to High Bandwidth Instruction Fetching, In Proceedings of the 29th Annual International Symposium on Microarchitecture, Dec. 2-4, 1996, Paris, France (11 pages).

Slechta, B. et al, Dynamic Optimization of Micro-Operations, Proceedings of The 9th International Symposium on High-Performance Computer Architecture, Feb. 8-12, 2003 (12 pages).

Smith, J. E. and Pleszkun, A. R., Implementation of Precise Interrupts in Pipelined Processors, Proc. Computer Architecture, 1985 (15 pages).

Tremblay, M., High-Performance Fault-Tolerant VLSI Systems Using Micro Rollback, Los Angeles, California, Sep. 1991, pp. 72-74, 81, 89-90, 102-104 and 246 (14 pages).

Vijaykumar, T. N., et al., Speculative Versioning Cache, IEEE Transaction on Parallel and Distributed Systems, vol. 12, No. 12, Dec. 2001, pp. 1305-1317 (13 pages).

* cited by examiner

| Tag | Mask |
|---|---|

A

| Tag 0 | Mask 0 |
|---|---|
| Tag 1 | Mask 1 |

B

| Tag 0 | Mask 0 |
|---|---|
| Tag 1 | |

C

| Tag 0 |
|---|
| Tag 1 |
| : |
| Tag 1 |

MAINTAINING MEMORY COHERENCY WITH A TRACE CACHE

RELATED APPLICATIONS

Under 35 U.S.C. 119(e), this application claims the benefit of priority to U.S. Provisional Application No. 60/731,785, filed Oct. 31, 2005, entitled "Maintaining Memory Coherency Within a Trace Cache," and is incorporated by reference herein, in its entirety.

FIELD OF THE INVENTION

The present invention relates generally to microprocessors and more particularly to microprocessor trace cache management.

BACKGROUND OF THE INVENTION

In some microprocessors a trace cache is used to store a series of decoded instructions for execution by a processor. The decoded instructions are produced from corresponding originating instructions. Occasionally one or more of the originating instructions are modified (by memory write instructions, for example) during the time the decoded instructions are stored in the trace cache. Then the decoded instructions (now invalid) are removed from the trace cache. Conventional removal of these decoded instructions is inefficient in terms of power and performance.

Accordingly, what is needed is a more effective way of managing a microprocessor trace cache. The present invention addresses such a need.

SUMMARY OF THE INVENTION

A method and system for maintaining memory coherence in a trace cache is disclosed. The method and system comprises monitoring a plurality of entries in a trace cache. The method and system includes selectively invalidating at least one trace cache entry based upon detection of a modification of the at least one trace cache entry.

If modifications are detected, then corresponding trace cache entries are selectively invalidated (rather than invalidating the entire trace cache). Thus trace cache coherency is maintained with respect to memory in a performance and power-efficient manner. The monitoring further accounts for situations where more than one trace cache entry is dependent on a single cache line, such that modifications to the single cache line result in invalidations of a plurality of trace cache entries.

BRIEF DESCRIPTION OF THE DRAWINGS

FIG. 3 illustrates a plurality of embodiments that can be utilized to describe a cache line entry.

DETAILED DESCRIPTION

Figure 1:
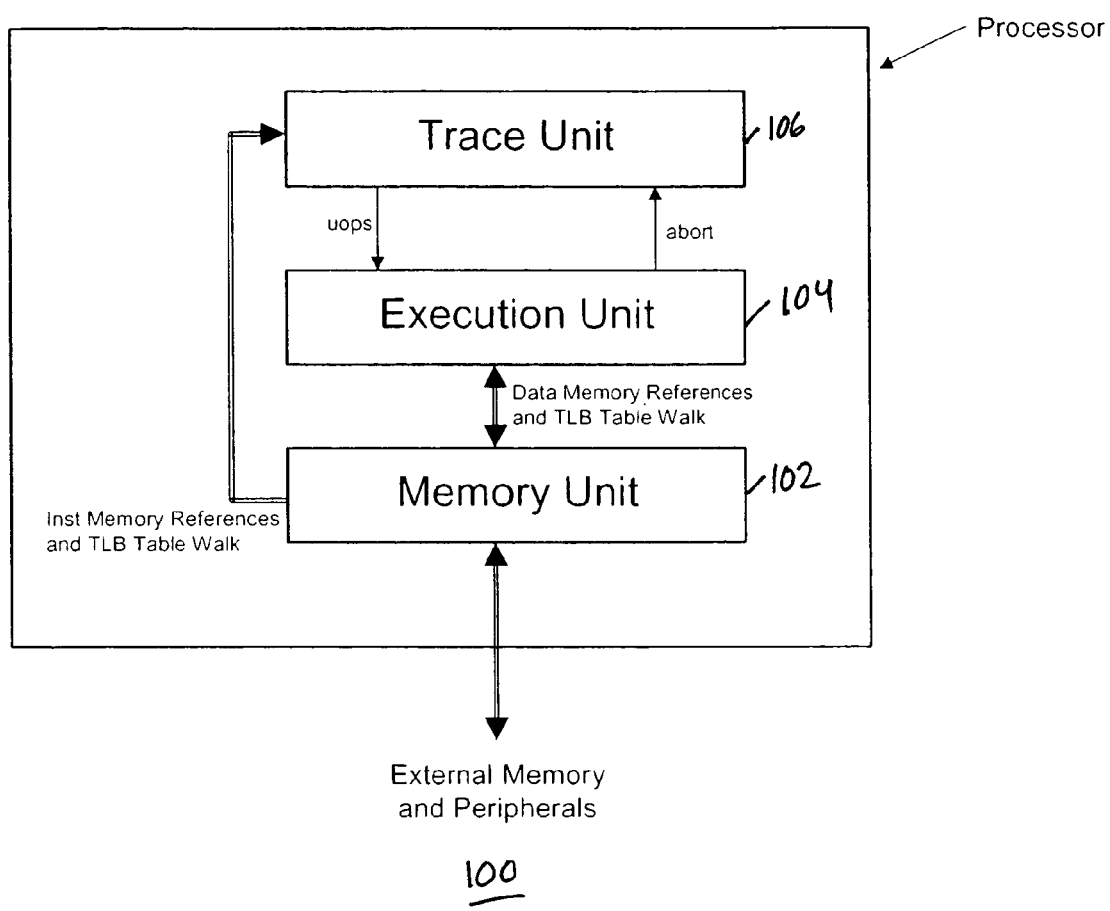
FIG. 1 illustrates selected aspects of a processor according to some embodiments of the invention.

The present invention relates generally to microprocessors and more particularly to microprocessor trace cache management. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Introduction

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification.

Particular Embodiments

A processor includes a trace cache having a plurality of entries used to store decoded instruction information produced from a plurality of instructions. The decoded instruction information is used to perform processing according to the original instructions. Each trace cache entry may be produced from one or more of the original instructions, and each of the original instructions may be used to produce one or more of the trace cache entries. If one of the original instructions is modified (such as by a self-modifying-code event created by execution of a memory store instruction by the processor), then all trace cache entries having any decoded instruction information produced from the modified original instructions are invalidated and removed from the trace cache. A maskable tag Content Addressable Memory (CAM) includes an address tag portion and an address mask portion. The maskable tag includes a composite of a conventional tag augmented by a mask to extend comparisons from a single cache line to a plurality of lines. Hardware logic generates respective address tag and mask information for storing into the CAM. Additional hardware logic invalidates corresponding entries in the trace cache based on self-modifying-code events detected in part by comparisons between a memory write address and the stored address tags according to the stored masks.

To describe the features of an embodiment of the present invention, refer now to the following description in conjunction with the following figures. A processor includes a Trace Unit (TU), an Execution Unit (EU), and a Memory Unit (MU). The TU reads instructions from the MU, translates those instructions to micro-operations, and sends those micro-operations to the EU. The TU includes an Instruction Cache (IC) that stores instructions previously read from the MU. When the TU reads instructions from the IC, an Instruction Decoder (ID) within the TU translates those instructions to micro-operation sequences. As instructions are decoded, the TU recognizes branch instructions to identify the boundaries of basic blocks. The TU stores the sequence of micro-operations corresponding to a basic block in a Basic Block Cache (BBC). The TU locates micro-operation sequences corresponding to a basic block in the BBC using the process described below. When a micro-operation sequence is located in the BBC, the TU records information from the EU relating to the historical outcome of the basic block's ending branch.

The TU also includes a Multi-Block Cache (MBC), which is a form of trace cache. When the TU recognizes that a sequence of basic blocks is consistently executed, the TU stores the trace of micro-operations corresponding to those basic blocks in the MBC. This process of allocating a trace to the MBC is called "promotion".

A unified Operation Sequencer (OS) predicts the next instruction address, which is used to access the MBC, BBC, and IC in parallel in order to determine the location of the next micro-operation sequence. When the access hits in the MBC, the sequence is called a "hot path": the TU selects the corresponding trace of micro-operations from the MBC, and sends those micro-operations to the EU. When the access misses the MBC, but hits in the BBC, the sequence is called a "warm path": the TU selects the corresponding block of micro-operations from the BBC, and sends those micro-operations to the EU. When the access misses both the MBC and BBC, but hits in the IC, the sequence is called a "cold path": the TU selects the micro-operations translated by the ID, and sends those micro-operations to the EU. If the access misses the MBC, BBC, and IC, the sequence is also called a "cold path": the TU reads instructions from the MU, as described above.

When a micro-operation sequence is located in the MBC, the TU records information from the EU relating to the outcome of the trace's internal and ending branches. Using that information, the TU can extend a trace in the MBC by concatenating the trace micro-operation sequence with a micro-operation sequence from the BBC. This process is another form of "promotion". Similarly, the TU can use the recorded branch information to remove or shorten a trace in the MBC, for example, by removing one or more basic blocks from the end of the trace. The process of removing or shortening traces in the MBC is called "demotion".

FIG. 1 illustrates selected aspects of a processor 100 according to some embodiments of the invention. The processor 100 includes a Memory Unit (MU) 102, Execution Unit (EU) 104, and Trace Unit (TU) 106.

The MU 102 includes a Level-3 data cache (L3C) that stores copies of recently accessed data and instruction memory locations. The MU 102 also includes circuitry to translate instruction and data memory page address to physical frame addresses, as well as circuitry that interfaces to external memory and peripheral devices.

The EU 104 includes circuitry to execute integer, floating-point, and multimedia instructions. The EU 104 also includes Level-1 and Level-2 data caches (L1D and L2D) that store copies of recently accessed data memory locations, as well as a Data Translation Lookaside Buffer (DTLB) that stores recently used data memory page translations.

In some embodiments of the invention, the EU 104 commits traces atomically. That is, the processor's architecture is updated if an only a trace executes to completion. If an exception occurs during the execution of a micro-operation sequence that forms a trace, the EU 104 preserves or restores the processor architecture to its state before the trace began executing and signals an abort to the TU 106. In alternate embodiments, the EU 104 atomically commits entire instructions, but not necessarily entire traces.

Figure 2:
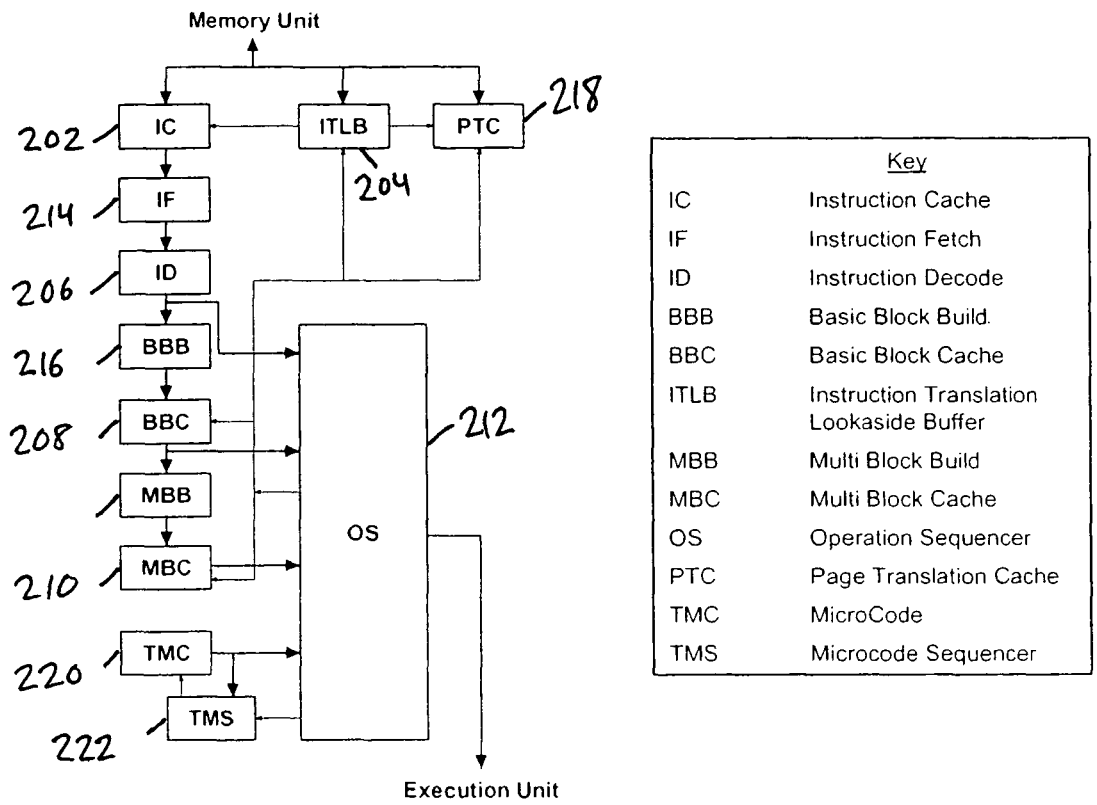
FIG. 2 illustrates a trace unit's internal organization.

FIG. 2 shows the TU's 106 internal organization. The TU 106 includes an IC 202 that stores copies of recently accessed instruction memory locations, as well as an Instruction Translation Lookaside Buffer (ITLB) 204 that stores recently used instruction memory page translations. The TU 106 also includes an Instruction Decoder (ID) 206, as well as BBC and MBC caches 208 and 210 that store sequences of recently executed micro-operations. An Operation Sequencer (OS) 212 determines the sequence of virtual addresses used to fetch instructions from the caches. The TU's 106 function and organization are described in more detail below.

Cold Path

A "cold path" access occurs when OS 212 identifies the virtual address of an instruction that is located in the IC 202, an external cache, or external memory. The virtual address produced by OS 212 is translated by the ITLB 204 to a physical address, which is used for cold path accesses.

The ITLB 204 is a conventional Instruction Translation Lookaside Buffer. If a virtual address misses the ITLB 204, the TU 106 sends the virtual address to MU 102, which refers to tables in memory to translate the virtual page address to the corresponding physical frame address. The MU 102 then returns that physical frame address to the ITLB 204.

In alternative embodiments, circuitry within the TU 106 performs additional functions to translate virtual addresses. For example, an x86 processor operating in certain modes requires segmented address calculations, which involves adding a code segment base address to the virtual address to produce a linear address that is translated to the corresponding physical address. Those skilled in the art will understand how to adapt the description below when it refers to virtual addresses to other addressing schemes, which include but are not limited to: x86 linear addresses; reduced instruction set computing (RISC) address; or any other forms of memory addressing for programmable processors.

The IC 202 is a conventional instruction cache. In some embodiments of the invention, the IC 202 has a capacity of 64 KB stored in 512 lines of 128 B each with an 8-way set-associative organization. If an instruction access misses the IC 202, the TU 106 sends the physical address to the MU 102, which locates the address in the L3C or external memory, and returns the accessed instruction line to the TU 202.

The IF 214 is a conventional Instruction Fetch unit that includes four instruction buffers of 16 B each to hold consecutive instructions being fetched. The IF 214 includes circuitry that uses the lower bits of the instruction address to select and shift the buffer contents to align the next instruction, which is sent to the ID 206. The IF 214 also calculates the length of the aligned instruction, then adjusts the instruction address to select and align the following instruction.

The ID 206 is an Instruction Decode unit that translates an instruction received from the IF 214 to one or more micro-operations. For embodiments of the invention optimized to support architectures with complex instructions of various formats, such as x86, the decoding circuitry may be pipelined to operate at high frequency. For architectures that execute multiple instructions per clock cycle, the ID 206 ordinarily decodes multiple instructions per cycle to ensure adequate instruction bandwidth to the execution unit. In some embodiments, the cold path is rarely used, so the ID 206 can be designed to decode only one instruction per clock cycle without substantially reducing the overall performance of the processor. The ID 206 also calculates the virtual address of the next sequential instruction either by adding the instruction's length to the current instruction address or, if the instruction is a relative branch, by adding the branch displacement to the current instruction address.

The ID 206 sends micro-operations to the Basic Block Build (BBB) unit 216, which combines the micro-operations into a wider instruction format that is directly executed by the EU 104.

Increasing use of Just In Time (JIT) code and other similar technologies makes Self-Modifying Code (SMC) events within a processor such as that described above more likely. In other words, processors are more frequently writing to memory locations that are soon to be fetched and executed as instruction code or writing to memory locations nearby instruction code more often.

Invalidating an entire trace cache due to a modification of as little as a single instruction for which decoded instruction information is retained in the trace cache results in reduced performance and increased power consumption. However, instructions processed to produce a single trace cache entry may originate from multiple cache lines that may be sequential (straight-line code) or that may be non-sequential (one or more branches).

In a method and system in accordance with the present invention, monitoring is performed with respect to each trace cache entry, and the monitoring accounts for possibly multiple underlying (and potentially non-sequential) originating cache lines to detect any modifications to any of the cache lines the respective trace cache entry originated from. If modifications are detected, then corresponding trace cache entries are selectively invalidated (rather than invalidating the entire trace cache). Thus trace cache coherency is maintained with respect to memory in a performance and power-efficient manner. The monitoring further accounts for situations where more than one trace cache entry is dependent on a single cache line, such that modifications to the single cache line result in invalidations of a plurality of trace cache entries.

Various embodiments described herein serve to maintain trace cache coherency with relatively simple hardware structures that tend to minimize logic and power required. The hardware structures also tend to minimize the number of trace cache entries that are invalidated as a result of an SMC event (whether a "true" SMC event or a write to locations that are nearby instruction code but are not actually executed as instructions).

In an embodiment, there is a pairwise combining of entities to provide a tag-mask combination, either a pair of addresses, a combination of an address and a tag mask combination, or a combination of two tag mask combinations. Accordingly, a plurality of combinations can be utilized to describe a cache line entry. For example, referring now to FIG. 3, a single tag-mask could be utilized for an entry (A) A plurality of tag mask combinations could be utilized for a single entry (B). A tag mask combination with a tag could be utilized for a single entry (C). Finally, a plurality of tags could be utilized for a single entry (D). In addition, an unmasked array can be used as a block for a single entry. In the alternative, the mask of a tag mask combination can be turned off (all 0s) to provide a block sized entry.

Figure 4:
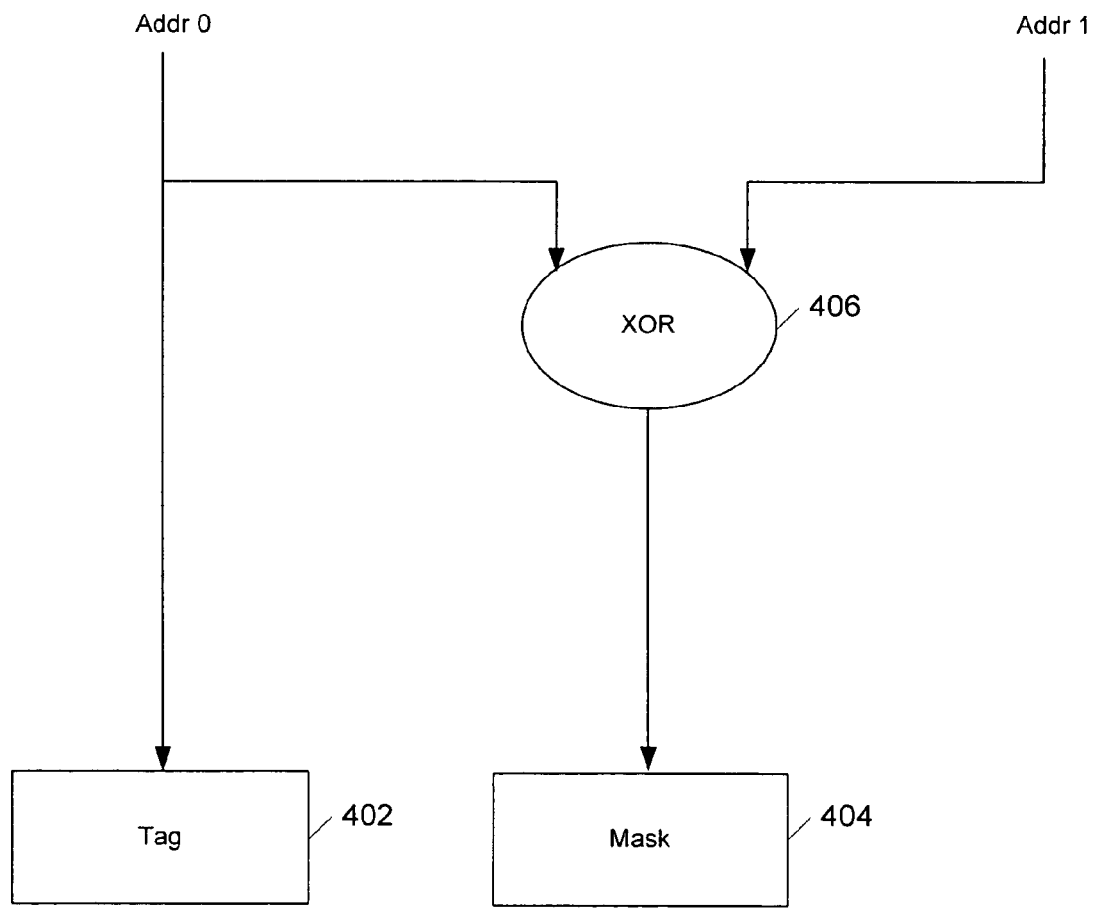
FIG. 4 illustrates a method for creating a tag mask combination from two addresses.
Figure 5:
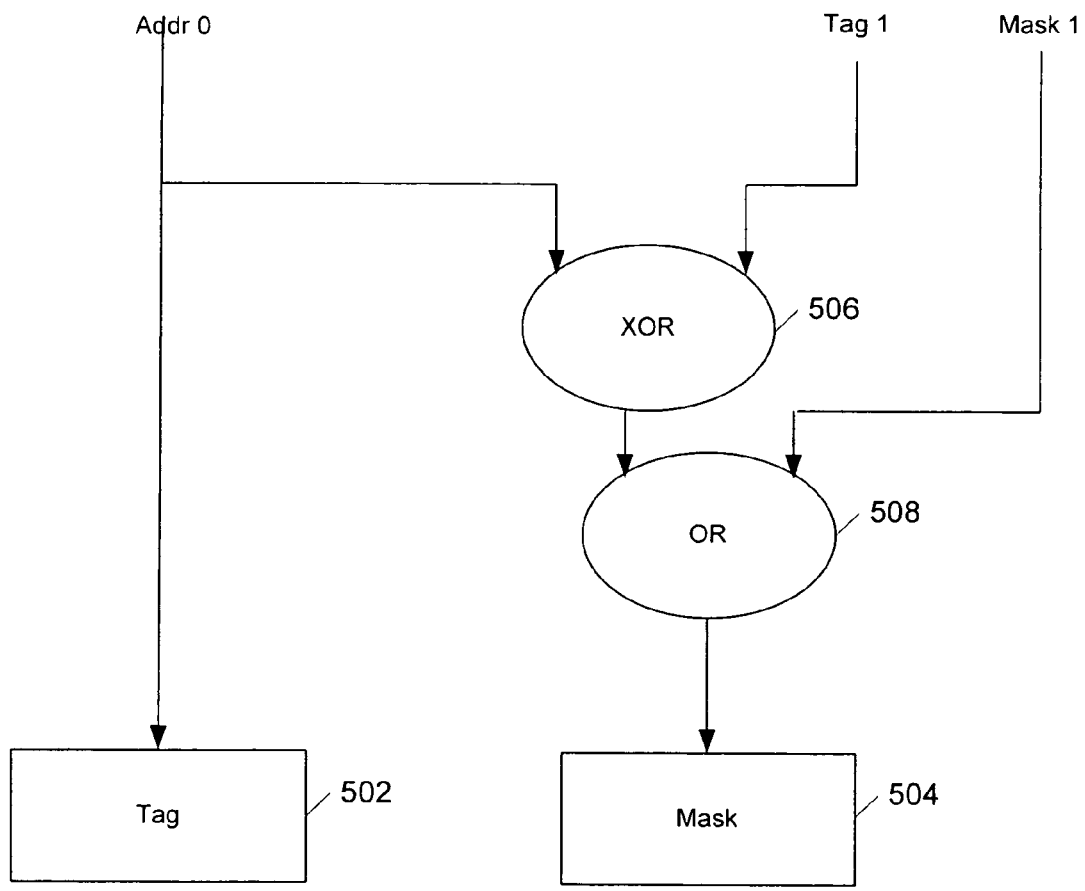
FIG. 5 illustrates a method for creating a tag mask combination from an address and an existing tag mask combination.
Figure 6:
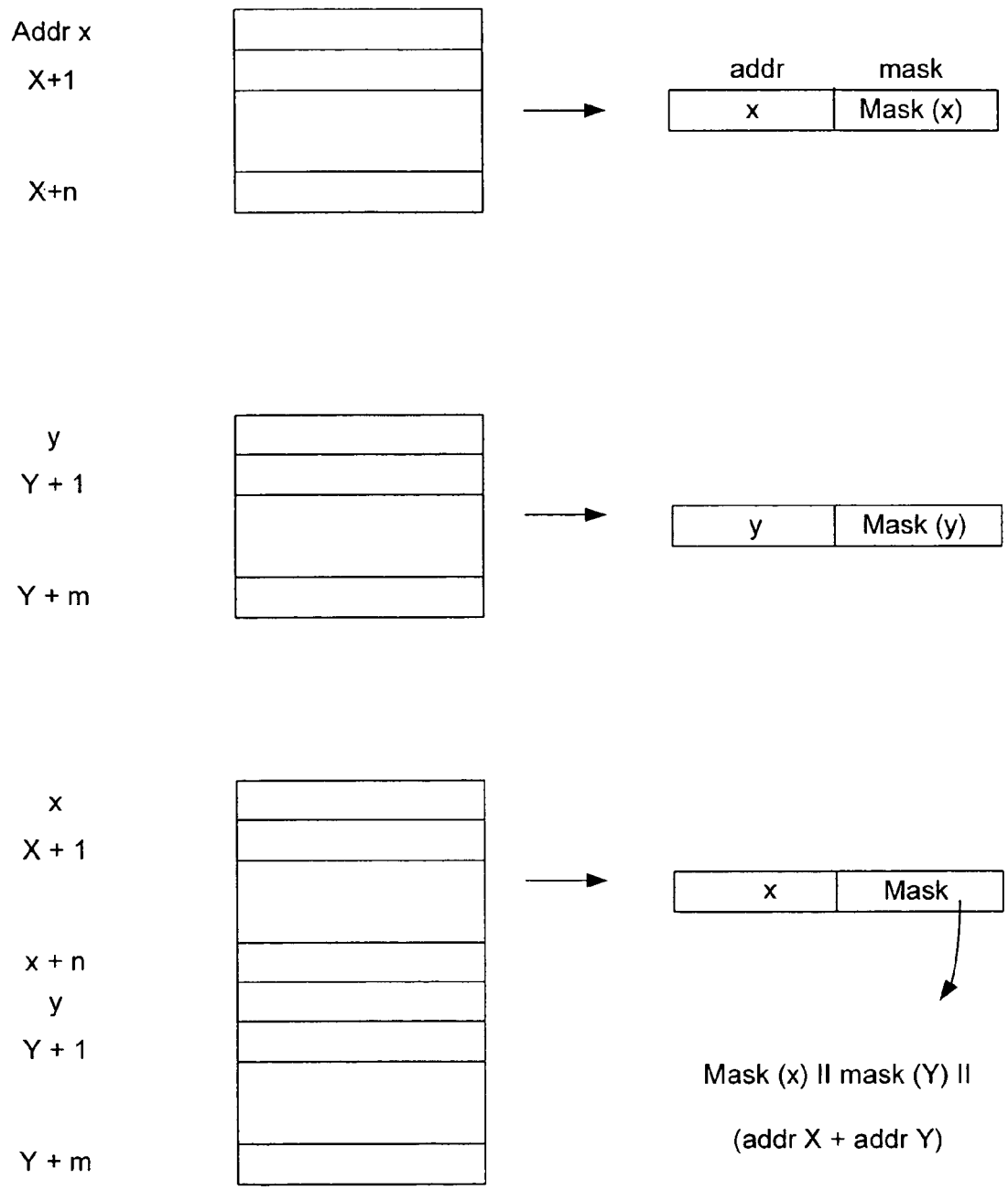
FIG. 6 illustrates a method for creating a tag mask combination from two tag mask combinations.

FIGS. 4-6 illustrate selected details of embodiments of logic to create tag and mask combinations configured to detect self-modifying code events. Tag mask combinations can be created in a variety of ways. A first way is to combine two addresses to provide the tag mask. FIG. 4 illustrates a method for creating a tag mask combination from two addresses. As is seen, address 0 is utilized as the tag 402 and the mask portion 404 of the entry is set to the XOR 406 address 0 and address 1.

FIG. 5 illustrates a method for creating a tag mask from an address and an existing tag-mask combination. In this embodiment, address 0 is the tag. The address 0 and the tag which form the tag mask combination are XORed 506 with each other and the tag and the mask are ORed 508 with each other to provide the mask.

FIG. 6 illustrates a method for creating a tag mask combination from two existing tag-mask combinations. In this embodiment two tag mask combinations x-mask y-mask to provide the tag-mask pair y and mask where the mask comprises masks x ||mask y|| (address x+address y).

Figure 7A:
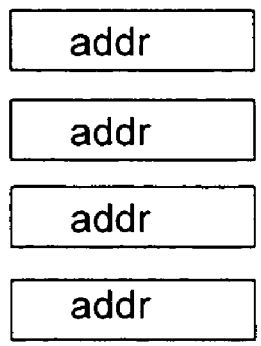
FIGS. 7A-7C illustrate different entities for providing a tag mask combination.
Figure 7B:
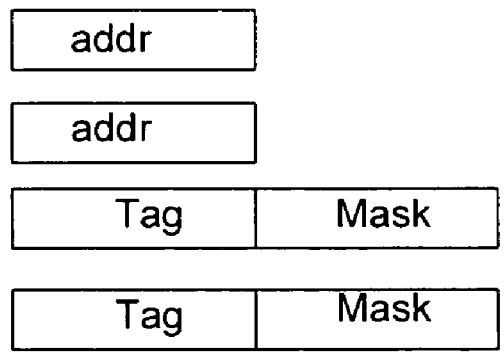
Figure 7C:
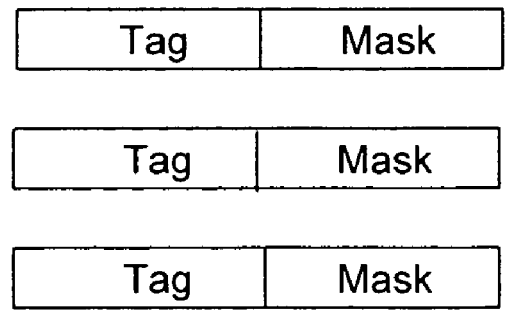

These three methods can be utilized singly or in combination to provide the appropriate tag-mask combinations. For example, to provide the tag mask combination from a plurality of addresses (shown in FIG. 7A) a combination of the methods described in FIGS. 4-6 could be utilized. To provide the tag mask combination from a plurality of addresses with a plurality of tag mask combinations (shown in FIG. 7B) may include the methods described in FIGS. 4 and 6. Finally, if a plurality of tag mask combinations (shown in FIG. 7C) are utilized to create a new tag mask combination utilizing the method of FIG. 6.

Accordingly, in a typical operation, the address tag portion of a trace cache entry is set to the cache line address of an instruction in the trace cache entry. The mask portion of the entry is set to be the combination of all the cache line addresses that instructions in the trace cache entry are created from. As is seen from the above, this is an XOR of the addresses and potentially the addition ORing of the tag and mask of the corresponding mask combination. Hence, if additional instructions and cache lines are appended to an existing trace cache entry, then the mask is updated by performing an XOR on the new cache line address to be appended with the previous address tag. The result is then OR'ed in with the previous mask.

For example, if a trace cache entry is built from instructions from cache line addresses 0x100 and 0x101, then the address tag would be set to 0x100 while the mask would be set to 0x001. If the cache line address 0x102 is then appended to the entry, then the mask would be updated to 0x003.

Figure 8:
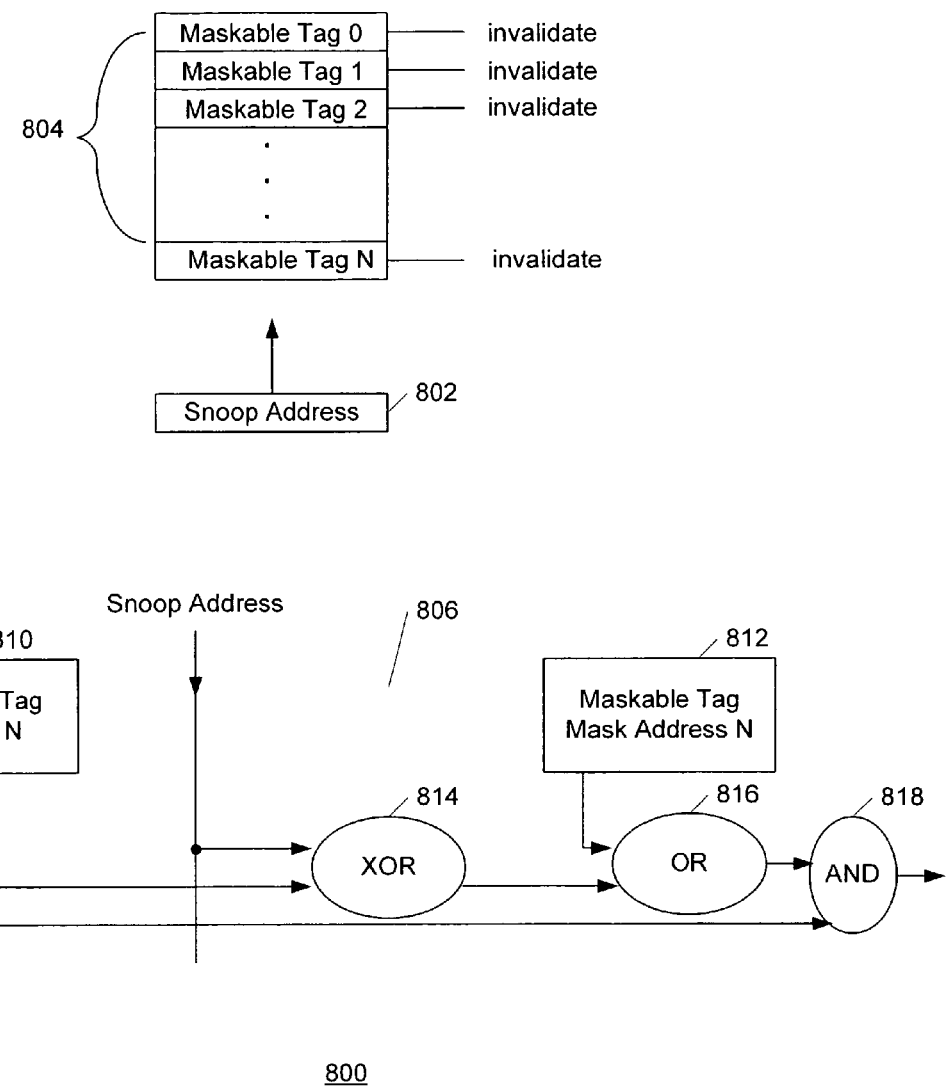
FIG. 8 illustrates an embodiment of a maskable tag for detecting modifications to trace cache entries due to self-modifying code events.

FIG. 8 illustrates an embodiment of a maskable tag CAM 800 for detecting modifications to trace cache entries due to self-modifying code events. The upper portion of the figure illustrates the maskable tag CAM 800 in an operating context including a snoop address 802 being applied for masked comparison with each of the maskable tags 804 of the maskable tag CAM 800. The snoop address 802 corresponds to the address of a memory modification (such as generated by a processor write instruction) that is to be checked for a possible self modifying code event.

The lower portion of the figure is a logic diagram 806 of a bit-slice of an entry of the maskable tag CAM 800. Each of the entries in the maskable tag CAM 800 includes a plurality of bit-slices, "horizontally" arranged such that the AND result 818 of one bit-slice is propagated as an AND input of an adjacent slice. Sufficient slices are used to provide comparisons for all relevant bits of the snoop address. The slice producing a final AND result conveys a respective one of the "invalidate" signals illustrated in the upper portion of the figure.

In operation, whenever a cache line is modified, a snoop invalidate process is performed. The snoop invalidate process compares the cache line address of the modified cache line (i.e, the snoop address) with each of the maskable tags of all the entries within the trace cache. For each entry where an unmasked portion of the tag matches the snoop address, the respective entry is invalidated.

Illustrative Combinations

This concludes with a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusion section, the invention encompasses all possible modifications and variations within the scope of the issued claims, which are appended to the very end of the patent.

A first embodiment of a system including a trace cache having a plurality of entries, each of the entries including a tag portion and a mask portion; and mask generating logic configured to exclusive-or a first cache line address of a first byte of a current instruction with a second cache line address of a last byte of the current instruction to form an instruction mask, the mask generating logic being further configured to inclusive-or the instruction mask with an exclusive-or of the first cache line address and a third cache line address of a previous instruction.

The first embodiment further including a processor adapted to execute program instructions in response to decoded instruction information provided from the trace cache. The aforementioned embodiment wherein one of the program instructions is a memory write instruction. The aforementioned embodiment wherein the memory write instruction modifies at least one of a byte of the current instruction and a byte of the previous instruction. The first embodiment wherein each entry is enabled to store at least one of a respective address and a respective mask. The first embodiment wherein each entry is enabled to compare a snoop address applied to all of the entries with a respective stored address. The first embodiment wherein each entry is enabled to mask a snoop address applied to all of the entries with a respective stored mask. The first embodiment wherein each entry is enabled to mask a snoop address applied to all of the entries with a respective stored mask and then to compare the masked snoop address with a respective stored address. The aforementioned embodiment wherein if the masked snoop address matches the respective stored address then the respective entry is invalidated.

A second embodiment of a method including the steps of creating a trace cache entry corresponding to a first cache line; appending the trace cache entry to further correspond to a second cache line; wherein the appending includes modifying a stored comparison address of the entry so that a memory write to the second cache line is detectable by comparing an address of the memory write to the stored comparison address; and wherein the comparing includes masking a portion of the memory write address according to a stored mask.

The second embodiment wherein the stored mask is dedicated to the trace cache entry. The second embodiment wherein the appending further includes modifying the stored mask.

A third embodiment of a method including the steps of creating a trace cache entry corresponding to a first cache line; amending the trace cache entry to further correspond to a second cache line; wherein the amending includes modifying a stored mask of the entry so that a memory write to the second cache line is detectable by comparing an address of the memory write to a stored comparison address; and wherein the comparing includes masking a portion of the memory write address according to the modified stored mask.

The third embodiment wherein the stored comparison address is dedicated to the trace cache entry. The third embodiment wherein the amending further includes modifying the stored comparison address.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method comprising:
monitoring a plurality of entries in a trace cache,
wherein each of the plurality of trace cache entries includes
a mask portion and a tag portion,
wherein the tag portion of each entry is set to a cache line address of a particular instruction in at least one trace cache entry, and the mask portion of each entry is a combination of entities that identify blocks of instructions that the at least one trace cache entry is created from,
wherein a mask portion tag portion combination with an address is obtained by:
using the address as the tag portion,
XORing the address with the tag portion, and
ORing a result of the XORing with the mask portion of the tag portion mask portion combination to form a new tag portion mask portion combination; and
selectively invalidating the at least one trace cache entry based upon detection of a modification of the at least one cache entry.

2. The method of claim 1 wherein the trace cache comprises a hardware cache.

3. The method of claim 1 wherein the plurality of trace cache entries are created by a pairwise combination of entities.

4. The method of claim 1 wherein the entities include any or any combination of
a plurality of addresses;
a mask portion tag portion combination with an address; and
one mask portion tag portion combination with another mask portion tag portion combination.

5. The method of claim 1 wherein a trace cache entry further comprises at least one of:
a plurality of tag portion mask portion combinations;
a tag portion mask portion combination with a tag; and
a plurality of tag portions.

6. The method of claim 1 wherein two cache line addresses are combined by using one of the two cache line addresses as the tag portion and XORing the two addresses to provide the mask portion.

7. The method of claim 1 wherein the at least one trace cache entry is created from instructions of at least one block of memory identified by at least one unmasked address.

8. A trace cache system comprising:
a trace cache; and
a mechanism coupled to the trace cache for monitoring a plurality of entries in a trace cache,
wherein each of the plurality of trace cache entries includes
a mask portion and a tag portion,
wherein the tag portion of each entry is set to a cache line address of a particular instruction in at least one trace cache entry, and the mask portion of each entry is a combination of entities that identify blocks of instructions that the at least one trace cache entry is created from, wherein a mask portion tag portion combination with an address is obtained by:
using the address as the tag portion,
XORing the address with the tag portion, and
ORing a result of the XORing with the mask portion of the tag portion mask portion combination to form a new tag portion mask portion combination; and
selectively invalidating the at least one trace cache entry based upon detection of a modification of the at least one cache entry.

9. The trace cache system of claim 8 wherein the trace cache comprises a hardware cache.

10. The trace cache system of claim 8 wherein the plurality of trace cache entries are created by a pairwise combination of entities.

11. The trace cache system of claim 8 wherein the entities include any or any combination of:
a plurality of addresses;
a mask portion tag portion combination with an address; and
one mask portion tag portion combination with another mask portion tag portion combination.

12. The trace cache system of claim 8 wherein a trace cache entry further comprises at least one of:
a plurality tag portion mask portion combinations;
a tag portion mask portion combination with a tag; and
a plurality of tag portions.

13. The trace cache system of claim 8 wherein two cache line addresses are combined by using one of the two cache line addresses as the tag portion and XORing the two addresses to provide the mask portion.

14. The trace cache system of claim 8 wherein the at least one trace cache entry is created from instructions of at least one block of memory identified by at least one unmasked address.

15. A processor comprising:
an execution unit;
a memory unit in communication with the execution unit; and
a trace cache unit in communication with the execution unit;
the trace cache unit including a mechanism for monitoring a plurality of entries in a trace cache,
wherein each of the plurality of trace cache entries includes a mask portion and a tag portion,
wherein the tag portion of each entry is set to a cache line address of a particular instruction in at least one trace cache entry, and the mask portion of each entry is a combination of entities that identify blocks of instructions that the at least one trace cache entry is created from,
wherein a mask portion tag portion combination with an address is obtained by:
using the address as the tag portion,
XORing the address with the tag portion, and
ORing a result of the XORing with the mask portion of the tag portion mask portion combination to form a new tag portion mask portion combination; and
selectively invalidating the at least one trace cache entry based upon detection of a modification of the at least one cache entry.

16. The processor of claim 15 wherein the trace cache comprises a hardware cache.

17. The processor of claim 15 wherein the plurality of trace cache entries are created by a pairwise combination of entities.

18. The processor of claim 15 wherein the entities include any or any combination of:
a plurality of addresses;
a mask portion tag portion combination with an address; and
one mask portion tag portion combination with another mask portion tag portion combination.

19. The processor of claim 15 wherein a trace cache entry further comprises at least one of:
a plurality of tag portion mask portion combinations;
a tag portion mask portion combination with a tag; and
a plurality of tag portions.

20. The processor of claim 15 wherein two cache line addresses are combined by using one of the two cache line addresses as the tag portion and XORing the two addresses to provide the mask portion.

21. The processor of claim 15 wherein the at least one trace cache entry is created from instructions of at least one block of memory identified by at least one unmasked address.

* * * * *